(12) United States Patent
Schilling et al.

(10) Patent No.: US 7,215,450 B2
(45) Date of Patent: *May 8, 2007

(54) OPTICALLY VARIABLE ELEMENT

(75) Inventors: Andreas Schilling, Hagendorn (CH); Wayne Robert Tompkin, Baden (CH); René Staub, Hagendorn (CH)

(73) Assignee: Leonard Kurz GmbH & Co. KG, Furth (DE)

( * ) Notice: Subject to any disclaimer, the term of this patent is extended or adjusted under 35 U.S.C. 154(b) by 265 days.

This patent is subject to a terminal disclaimer.

(21) Appl. No.: 10/514,370

(22) PCT Filed: May 9, 2003

(86) PCT No.: PCT/DE03/01483

§ 371 (c)(1), (2), (4) Date: Dec. 20, 2004

(87) PCT Pub. No.: WO03/095657

PCT Pub. Date: Nov. 20, 2003

(65) Prior Publication Data

US 2005/0168723 A1 Aug. 4, 2005

(30) Foreign Application Priority Data

May 14, 2002 (DE) .............................. 102 21 491

(51) Int. Cl.
*G03H 1/00* (2006.01)

(52) U.S. Cl. .............................. 359/2; 430/10; 283/86; 428/29

(58) Field of Classification Search .................... 359/2, 359/567; 430/10; 428/29; 283/86
See application file for complete search history.

(56) References Cited

U.S. PATENT DOCUMENTS

| | | | |
|---|---|---|---|
| 3,858,977 A * | 1/1975 | Baird et al. ................... 356/71 |
| 4,568,141 A | 2/1986 | Antes |
| 4,856,857 A | 8/1989 | Takeuchi et al. |
| 5,032,003 A | 7/1991 | Antes |
| 6,157,487 A * | 12/2000 | Staub et al. ................. 359/567 |
| 6,975,438 B2 * | 12/2005 | Schilling et al. ............... 359/2 |
| 2001/0043396 A1 | 11/2001 | Lee |

FOREIGN PATENT DOCUMENTS

| | | |
|---|---|---|
| DE | 4432062 | * 11/1995 |
| DE | 4432062 C1 | 11/1995 |
| EP | 0 105 099 | 4/1984 |
| EP | 0 375 833 | 7/1990 |
| WO | WO 97/19821 | 6/1997 |
| WO | WO0180175 A1 | 10/2001 |

OTHER PUBLICATIONS

O.S. Heavens, Ph.D., *Optical Properties of Thin Solid Films*, Butterworths Scientific Publications, pp. 155-161 (London 1955).

* cited by examiner

*Primary Examiner*—Leonidas Boutsikaris
(74) *Attorney, Agent, or Firm*—Hoffman & Baron, LLP

(57) ABSTRACT

The present invention relates to an optically variable element having surface portions with achromatic surface structures and different scatter, diffraction and reflection characteristics. The achromatic surface structures are combined with a thin-film structure, whereby upon turning or tilting the optically variable element, it is not the impression of a continuous color transition, but a defined, almost discrete color change that is produced for the viewer.

24 Claims, 1 Drawing Sheet

OPTICALLY VARIABLE ELEMENT

CROSS-REFERENCE TO RELATED APPLICATIONS

This application is a National Phase application of International Application No. PCT/DE03/01483 filed May 9, 2003, which claims priority based on German patent application No. 10221491.3-55 filed on May 14, 2002, which are incorporated herein by reference.

BACKGROUND OF THE INVENTION

For certain applications such as the document security field the aim involved is to offer security features which can be easily perceived and explained and which are defined for recognizing authenticity.

For example WO 97/19821 describes an optically variable surface pattern having at least one representation of a graphic configuration. Surface regions of a given kind are associated with each representation. Upon illumination with visible light the representations become visible in the form of images which exhibit light and dark spots at different viewing angles. The above-mentioned surface regions have grating structures, the line number of which is greater than 250 lines/mm so that markedly visible diffraction effects occur in the visible range.

A document with an optical-diffraction security element is known for example from EP 0 105 099 B1. The security element has a diffraction structure which, by virtue of diffraction of the incident light, produces at least one color pattern which represents a visually checkable authenticity feature. The diffraction structure is such that the color pattern which occurs with a given lighting and viewing direction moves at a locally predetermined speed along a predetermined path when the substrate is turned in its plane in a given direction of rotation and at a given speed.

EP 0 375 833 B1 discloses an optically variable surface pattern with a graphic representation, the surface pattern being divided into m-raster fields which contain optically active diffraction elements with more than 10 lines/mm. That known optically variable surface pattern provides that each raster field has a largest dimension of less than 0.3 mm and division into N-field components each with a respective diffraction element. Each diffraction element corresponds to a predetermined pixel of one of N-representations. The parameters of a relief structure are determined in each of the N-diffraction elements by the association with a surface portion so that each of the N-representations is visible in a predetermined direction of viewing the surface pattern.

U.S. Pat. No. 3,858,977 describes an optical interference security element. That known element has a substrate and a filter having at least one optical interference layer. The optical interference layer has a known characteristic in respect of its spectral reflectance and a known spectral transmittance which differs therefrom, both varying with the angle of incidence of light. The substrate which can form a surface region of a value-bearing document such as a banknote has a surface portion which is adjacent to the filter and is colored in order to absorb a part of the light transmitted through the filter.

Optically variable surface patterns which are designed like the above-described optically variable surface pattern, depending on the respective choice of design and technology, can produce different visual, optically variable effects, in dependence on the viewing angle, such as three-dimensionality or perspectivity, motion effects, image flips or the like. When the surface pattern or the element provided with such a surface pattern is turned or tilted about given axes in space, many design elements appear in the typical rainbow colors.

That virtually continuous transition over the entire rainbow spectrum now suffers from disadvantages in some security uses. It is in conflict with the aim of providing security features which can be easily recognized and explained and which are as well-defined as possible, for authenticity recognition. More specifically such a continuous color transition or color change represents a definition problem. In addition, a clear demarcation of features in respect of functionality and appearance between security application and commercial applications is necessary in order to prevent confusions occurring due to simple imitation or due to the transfer of commercial features onto security documents and so forth.

SUMMARY OF THE INVENTION

Therefore the object of the invention is to provide an optically variable element which for the viewer upon being turned or tilted does not give the impression of a continuous color transition but a defined, almost discrete color change.

According to the invention that object is attained in that surface portions of an optically variable surface pattern have achromatic surface structures with different scatter, reflection or diffraction characteristics and are combined in mutually superposed relationship with a thin-film structure. The object of the invention is further attained by a security element which has an optically variable surface pattern with two or more surface portions which have achromatic surface structures with different scatter, reflection or diffraction characteristics and are combined in mutually superposed relationship with a thin-film structure.

In that respect achromatic surface structures are surface structures which appear substantially colorless to the viewer. Examples of achromatic surface structures are macrostructures, achromatic blaze structures (asymmetrical structures), symmetrical structures, for example sine gratings, matt structures or kinoforms. With those different kinds of achromatic surface structures the achromatic characteristic is respectively achieved by a differing configuration of the surface structure. Examples of achromatic structures are disclosed in above-quoted WO 97/19821.

In the case of achromatic blaze structures such as for example sawtooth gratings and achromatic symmetrical structures such as for example sine gratings the period of the surface structures is not shorter than 1.5 µm. Blaze structures are distinguished in that they can be described in region-wise manner respectively as linear functions (sawtooth shape, rectangular shape) and thus act like tilted mirrors.

A preferred range of the size of the individual structures of the surface structure is the range of between 2 µm and 10 µm. The typical depth of those surface structures is in the range of between 500 nm and 2 µm. Structures from that range of sizes are to be preferred to even larger structures from the production engineering point of view.

Accordingly those achromatic structures are in a range in which diffraction phenomena have only a slight influence on the optical properties and the structures act substantially like tilted mirrors. Examples regarding the provision of achromatic blaze structures can be found in the article "Non-standard Diffraction Structures for OVD's" by Renen Staub et al., SPIE Vol. 3314, pages 194–202, 1998.

Macrostructures also act substantially by reflection. A macrostructure can be represented by a portion-wise steady and differentiatable function M (x, y) of the co-ordinates x and y of a notional reference plane. The function M (x, y) describes an area which is curved at least in partial regions, wherein in the partial region ΔM (x, y)=0 and the function M (x, y) is not a periodic triangular or rectangular function. A macrostructure has a three-dimensional relief shape which can be in the form of a complex pattern and which is shaped for example in the form of a logo or a symbol. Adjacent extreme values of a macrostructure are usually at least 0.1 mm away from each other.

Matt structures are characterized by a stochastic surface profile, wherein the mean depths and the lateral sizes of the structures can be described by statistical characteristic values. In that respect various structural parameters can occur in various preferred directions. Important structural parameters are for example the mean depth and the correlation length. Matt structures of that kind can be produced by processes which have a statistical characteristic. Those processes involve for example wet etching, grinding with abrasive, sand blasting or the like.

Typical numerical values for the mean roughness value of matt structures are between 20 nm and 2000 nm, preferably between 50 nm and 500 nm. Typical numerical values for the correlation length of matt structures are between 200 nm and 50,000 nm, preferably between 500 nm and 10,000 nm.

Kinoforms are structures which produce a user-defined scatter characteristic by means of diffraction effects.

The optically variable surface pattern according to the invention is used in particular in relation to security elements such as documents, banknotes, credit cards or the like. The security elements comprise a combination of thin-film structures with achromatic diffractive surface structures, whereby the visual effects of the thin-film structure and the visual effects of the diffractive surface structure can be particularly well matched to each other.

Preferred developments of the optically variable surface pattern according to the invention are characterized in the appendant claims.

A preferred embodiment of the optically variable surface pattern provides that the achromatic surface structures are in the form of matt structures which have different scatter characteristics.

A particularly attractive option in that respect provides for so designing the matt structures that the scatter characteristics of the surface portions differ in respect of color and contrast change. The optical effect which is achieved thereby permits particularly good demarcation of the optical features.

Further advantageous optical effects can be achieved if the matt structures differ in respect of their mean depth and/or in respect of their correlation length. The width of the scatter cone and the shape of the scatter cone can be determined by means of the parameters consisting of mean depth and correlation length. Surface portions with matt structures which differ in regard to the above parameters thus provide that the surface portions have scatter cones of differing shapes.

Matt structures can be in the form of isotropic matt structures. Isotropic means in that connection that the scatter characteristic of the matt structure is not dependent on the axis of rotation in the plane. In that respect, such isotropic matt structures are to be used in particular when changes in angles of rotation should not result in a change in the optical action of the variable optical element.

In order to achieve additional optical effects matt structures can be in the form of anisotropic matt structures. That can produce dynamic effects, for example a change in the brightness or the gray value in dependence on the angle of rotation.

A further preferred embodiment of an optically variable surface pattern according to the invention provides that the achromatic surface structures are in the form of macrostructures or blaze structures which have different reflection characteristics.

The size of the individual structures of the surface structure of blaze structures is in the range of between 2 μm and 10 μm. The typical depth of those surface structures is in the range of between 500 nm and 2 μm. The size of the macrostructure is preferably in the range of between 20 μm and 30 μm. The structural height of a macrostructure is preferably less than 5 μm but can also be 40 μm. Macrostructures and blaze structures act essentially by reflection. In that respect a large number of differing optical effects can be achieved by means of the choice of different reflection characteristics.

In regard to dimensioning of the macrostructures, the edge spacing and the edge gradient of the individual elements are as far as possible to be so selected that diffraction effects do not occur in the visible range. In addition the thin-film structure is preferably to be arranged on the macrostructure, that is to say it is to be arranged in the direction of the viewer.

Simple macrostructures can be described for surface portions by mathematical functions, for example by $M(x,y)=a \times (1+\sin(2\pi F_y x_y))$ for a periodic macrostructure. $F_y$ is in that case the spatial frequency of the periodic macrostructure M (x, y) in the direction of the co-ordinate axis y. In addition it is also possible for the macrostructure to be periodically composed of a predetermined portion of another mathematical function. The spatial frequency $F_y$ is of a value of at most 10 lines/mm and is preferably below a value of 3 lines/mm.

It is particularly advantageous in that respect for the surface structure of a surface portion to be in the form of a sawtooth structure (blaze structure). Further advantageous geometrical structures are for example microlens structures and wave structures (macrostructures).

Depending on the respective area of application involved, it is advantageous to choose a thin-film structure with a thin-film layer having a high refractive index or to choose a thin-film structure having a low refractive index. A high refractive index is preferably formed by a refractive index of greater than 2, for example a refractive index of 2.3 or 2.4. A low refractive index is preferably formed by a refractive index of lower than 1.5, for example a refractive index of 1.4.

In this respect thin-film structures can be formed in different ways. On the one hand it is possible for the structures to be formed from an even or an odd number of dielectric layers with different refractive indices, for example 5 or 10 such layers. It is further possible to form a thin-film structure from an absorption layer and a spacer layer (λ/4 or λ/2) which is adjoined by a reflection layer or an optical (transmissive) separation layer.

It is further advantageous for an optically variable surface pattern according to the invention to be superimposed with further security features. Thus it is possible for the optically variable surface pattern to be combined with an only partially provided reflection layer or to be superimposed with a diffractive structure, for example a kinegram. In addition it is also possible to produce a mosaic-like surface pattern.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
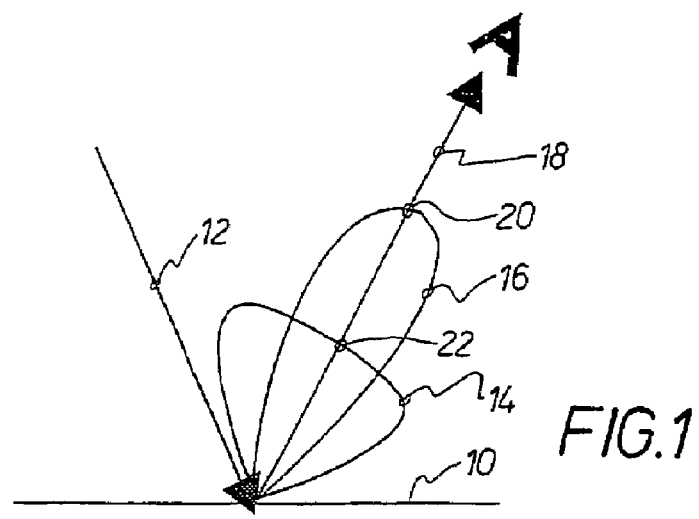
FIG. 1 shows an optically variable surface pattern with directed white light illumination to illustrate the action of the combination of a thin-film structure with two isotropic matt structures.

FIG. 1 shows a substrate 10 having a surface pattern which has a combination of a thin-film structure with two isotropic matt structures. The arrow 12 which is directed towards the substrate 10 indicates a directed white light illumination. Such a directed illumination occurs for example when the light comes from a single light source which is relatively far away from the substrate 10.

The two matt structures of the substrate 10 differ in respect of their mean depth and/or in respect of their correlation length so that the one matt structure scatters the directedly incident white light over a larger angular range than the other matt structure. The scatter cone of the matt structure with the larger angular range is identified by reference numeral 14 and the scatter cone of the other matt structure is identified by reference numeral 16.

On the assumption that the properties of the thin film and the properties of the matt structures are approximately independent of each other, there is the advantage here that the characteristic color switch, with directed illumination, can be more easily seen by the user as the color switch manifests itself not just in mirror reflection.

Reference numeral 18 denotes the observation direction, that is to say the direction from which the user views the substrate 10. The viewer must tilt the substrate 10 and position it in such a way that the light source appears in mirror reflection. The superimposition of the thin-film structure with the two matt structures provides that the viewing regions in which the thin-film effect can be recognized are advantageously enlarged. As shown in FIG. 1 for example the surface portion of the substrate 10, which is occupied by the matt structure with the scatter cone 16, is visible in a light-red color, that is to say in the thin-film color red with a correspondingly great intensity. That surface portion which is occupied by the matt structure having the scatter cone 14 admittedly also appears in a red color, but it is darker because of the larger scatter range since the intensity is correspondingly reduced in the observation direction identified by the arrow 18. This is clearly shown by the points 20 and 22.

Figure 2:
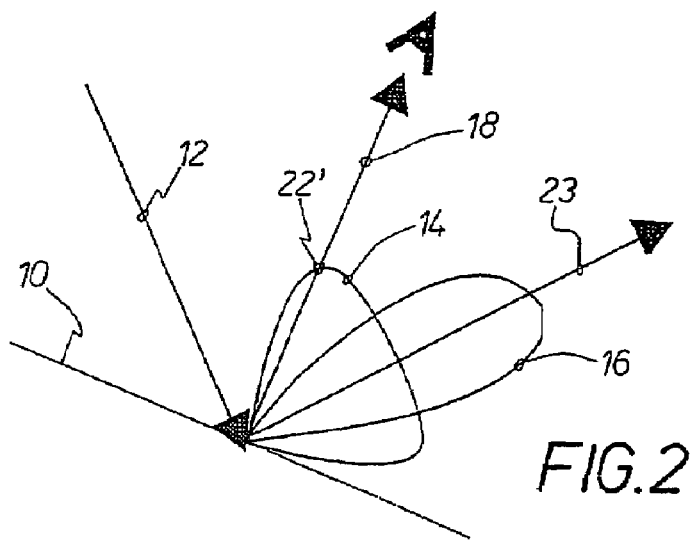
FIG. 2 is a view similar to FIG. 1, wherein however the optically variable pattern has been tilted, in comparison with FIG. 1.

When the substrate 10 is tilted—as is shown in FIG. 2—there is a change in the directed white light illumination 12 which is reflected by the thin film for example towards green, which is indicated by the arrow 23. The directed white light illumination indicated by the arrow 12 and the observation direction indicated by the arrow 18 remain unchanged.

By virtue of the differing scatter characteristics corresponding to the scatter cone 14 and the scatter cone 16 of the matt structures moreover the previously lighter surface portion as indicated at point 20 in FIG. 1 now appears darker and the surface portion which was previously darker as indicated by the point 22 now appears lighter, corresponding to the point 22' in FIG. 2. The specific color configuration is predetermined in that case by the thin film. It will be appreciated that the color change from red to green is only given by way of example. Besides the color change a contrast change in respect of relative lightness also advantageously occurs. Those two effects of the color and contrast changes can advantageously be used for referencing purposes and thus permit simple communication for the viewer.

Figure 3:
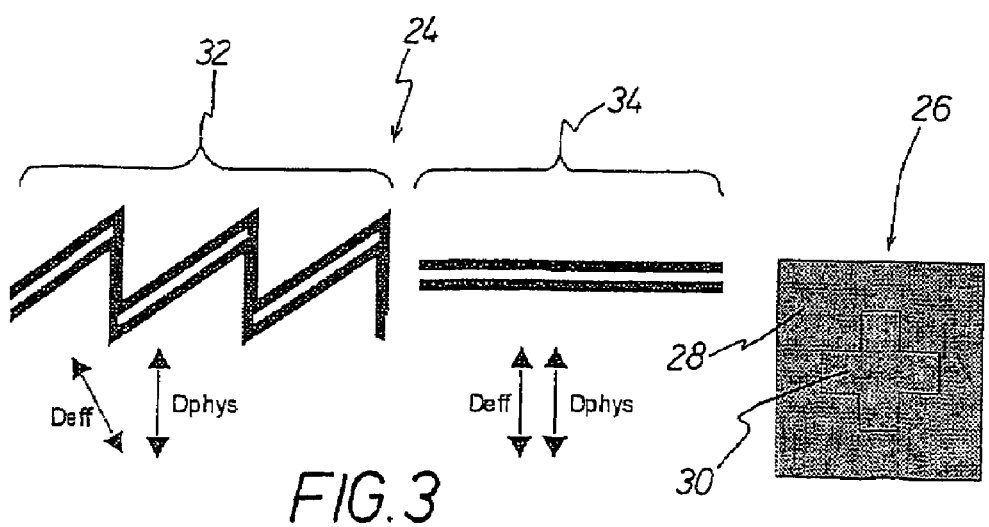
FIG. 3 is a diagrammatic view of an asymmetrical achromatic structure with a thin-film structure, and a flat thin-film structure.

FIG. 3 diagrammatically shows a combination of thin-film structure 24 with an asymmetrical achromatic structure. In that respect reference 26 diagrammatically represents a surface pattern comprising two different surface elements 28 and 30 which adjoin each other. The region 32 indicates an arrangement with a thin-film structure tilted sawtooth-like and the region 34 diagrammatically indicates a flat thin-film structure. The different optical actions of the two thin-film structures 32 and 34 essentially come about by virtue of the fact that there is a difference for the tilted thin-film structure 32 between the thin-film thickness Deff which is crucial in terms of the optical effect and the layer thickness Dphys which is physically vapor-deposited. In contrast thereto in regard to the flat thin-film structure 34 there is no difference between the thin-film thickness Deff which is crucial in terms of the optical effect and the physically vapor-deposited layer thickness Dphys. Two different effects can advantageously be produced with such a thin-film structure 24—depending respectively on whether a material with a high refractive index or with a low refractive index is selected for the thin film. Optical properties of thin layers are described for example in the book "Optical properties of thin solid films" by O. S. Heavens, London, Butterworths Scientific Publications, 1955, page 154 ff.

In the case of a thin-film material with a high refractive index it is possible to provide that the surface portions are of different colors and those colors are stable over a relatively great range of tilting angles. In the case of a thin-film material with a low refractive index it is possible to implement an asymmetrical color flip, that is to say in the event of a tilting movement a surface portion 28 or 30 respectively exhibits for example a color switch from red to green while the other surface portion 30 or 28 respectively exhibits a color switch from green to red. The red of the one surface portion and the red of the other surface portion are however not identical after such a tilting movement but are slightly different. A corresponding consideration also applies for the green color and for other colors.

Accordingly an achromatically diffractive effect is superimposed by a thin-film interference effect with a predetermined color flip, thereby ensuring a defined color change. The definition problems which exist in relation to a known continuous color change or which can only be excluded with difficulty are eliminated by the defined color change afforded in accordance with the invention.

What is claimed is:

1. An optically variable element, comprising surface portions with achromatic surface structures comprising at least one of different scatter, reflection and diffraction characteristics, wherein the achromatic surface structures comprise matt structures with different scatter characteristics in respect to color and relative lightness and wherein the surface portions are combined in mutually superposed relationship with a thin-film structure.

2. An optically variable element as set forth in claim 1, wherein the matt structures differ in respect to at least one of a mean depth and a correlation length.

3. An optically variable element as set forth in claim 1, wherein the matt structures comprise isotropic matt structures.

4. An optically variable element as set forth in claim 1, wherein the matt structures comprise anisotropic matt structures.

5. An optically variable element as set forth in claim 1, wherein the achromatic surface structures comprise at least one of achromatic blaze structures and macrostructures which have different reflection characteristics.

6. An optically variable element as set forth in claim 5, wherein a surface structure of a surface portion comprises a sawtooth structure.

7. An optically variable element as set forth in claim 1, wherein the thin-film structure comprises a thin-film layer with a high refractive index, the thin-film layer comprising a refractive index over 2.

8. An optically variable element as set forth in claim 1, wherein the thin-film structure comprises a thin-film layer with a low refractive index, the thin-film layer comprising a refractive index below 1.5.

9. An optically variable element as set forth in claim 1, adapted for use in a security element.

10. An optically variable element as set forth in claim 1, wherein the thin-film structure is formed from an even or odd number of dielectric layers which differ in refractive indices.

11. An optically variable element, comprising surface portions with achromatic surface structures comprising at least one of different scatter, reflection and diffraction characteristics, wherein the surface portions are combined in mutually superposed relationship with a thin-film structure and the achromatic surface structures comprise at least one of achromatic blaze structures and macrostructures which have different reflection characteristics.

12. An optically variable element as set forth in claim 11, wherein a surface structure of a surface portion comprises a sawtooth structure.

13. An optically variable element as set forth in claim 11, wherein the thin-film structure comprises a thin-film layer with a high refractive index, the thin-film layer comprising a refractive index below 2.

14. An optically variable element as set forth in claim 11, wherein the thin-film structure comprises a thin-film layer with a low refractive index, the thin-film layer comprising a refractive index below 1.5.

15. An optically variable element as set forth in claim 11, adapted for use in a security element.

16. An optically variable element comprising surface portions with achromatic surface structures comprising at least one of different scatter, reflection and diffraction characteristics, wherein the surface portions are combined in mutually superposed relationship with a thin-film structure of a physically vapor-deposited thickness $D_{phys}$, wherein the achromatic structures comprise at least one of achromatic blaze structures and macrostructures, wherein a first surface portion having a flat thin-film structure adjoining a second surface portion with the achromatic surface structure having a tilted thin-film structure, wherein in contrast to the flat thin-film structure the tilted thin-film structure exhibits a difference between the physically vapor-deposited thickness $D_{phys}$ and an effective thin-film thickness $D_{eff}$ being crucial in terms of the optical effect and hence the thin-film structures of the first surface portion and of the second surface portion have different optical actions and reflection characteristics.

17. an optically variable element as set forth in claim 16, wherein the achromatic blaze structures have a period of the surface structure not shorter than 1.5 micrometer.

18. An optically variable element as set forth in claim 16, wherein a surface structure of a surface portion comprises a sawtooth structure.

19. An optically variable element as set forth in claim 16, wherein the macrostructure is periodic with a spatial frequency of at most 10 lines per mm.

20. An optically variable element as set forth in claim 16, wherein the macrostructure is a three-dimensional relief shape of a complex pattern, wherein adjacent extreme values of the macrostructure are at least 0.1 mm away from each other.

21. An optically variable element as set forth in claim 16, wherein the thin-film structure comprises a thin-film layer with a high refractive index, the thin-film layer comprising a refractive index over 2.

22. An optically variable element as set forth in claim 16, wherein the thin-film structure comprises a thin-film layer with a low refractive index, the thin-film layer comprising a refractive index below 1.5.

23. An optically variable element as set forth in claim 16, wherein the thin-film structure is formed from an even or odd number of dielectric layers which differ in refractive indices.

24. An optically variable element as set forth in claim 16, adapted for use in a security element.

* * * * *

UNITED STATES PATENT AND TRADEMARK OFFICE
CERTIFICATE OF CORRECTION

PATENT NO. : 7,215,450 B2  Page 1 of 1
APPLICATION NO. : 10/514370
DATED : May 8, 2007
INVENTOR(S) : Schilling et al.

It is certified that error appears in the above-identified patent and that said Letters Patent is hereby corrected as shown below:

TITLE PAGE:

(73) Assignees: now reads "Leonard Kurz GmbH & Co., KG"
should read -- Leonhard Kurz GmbH & Co., KG --.

**(74) *Attorney, Agent, or Firm*** now reads "Hoffman & Baron, LLP"
should read -- Hoffmann & Baron, LLP --.

IN THE PATENT:

Column 7, line 45 now reads "a refractive index below 2."
should read -- a refractive index over 2. --

Signed and Sealed this

Fourteenth Day of August, 2007

JON W. DUDAS
*Director of the United States Patent and Trademark Office*